United States Patent [19]
Dai et al.

[11] Patent Number: 5,354,452
[45] Date of Patent: Oct. 11, 1994

[54] SYNTHESIS OF ZEOLITES

[75] Inventors: Eugene P. Dai; David E. Sherwood, Jr.; Burton H. Bartley, all of Port Arthur, Tex.

[73] Assignee: Texaco Inc., White Plains, N.Y.

[21] Appl. No.: 962,549

[22] Filed: Oct. 19, 1992

Related U.S. Application Data

[63] Continuation of Ser. No. 463,650, Jan. 11, 1990, abandoned.

[51] Int. Cl.$^5$ .................. C10G 47/16; C10G 45/12
[52] U.S. Cl. ..................................... 208/111; 208/120
[58] Field of Search ................. 502/79; 208/111, 120

[56] References Cited

U.S. PATENT DOCUMENTS

| | | | |
|---|---|---|---|
| 3,449,070 | 6/1969 | McDaniel et al. | 423/713 |
| 3,506,400 | 4/1970 | Eberly, Jr. et al. | 502/79 |
| 4,604,373 | 8/1986 | Clark | 502/79 |
| 4,663,025 | 5/1987 | Fu | 502/79 |
| 4,840,930 | 6/1989 | LaPierre et al. | 502/79 |
| 5,013,700 | 5/1991 | Falth | 502/79 |
| 5,059,567 | 10/1991 | Linsten et al. | 502/79 |

*Primary Examiner*—Carl F. Dees
*Attorney, Agent, or Firm*—Kenneth R. Priem; Carl G. Seutter; Cynthia L. Kendrick

[57] ABSTRACT

A novel zeolite characterized by a large number of secondary pores, a substantially decreased lattice constant, and a substantially decreased acid site density is attained by hydrothermal and acid-treating of an ultrastable Y-zeolite or a superultrastable Y-zeolite.

1 Claim, No Drawings

SYNTHESIS OF ZEOLITES

This is a continuation of application Ser. No. 07/463,650, filed Jan. 11, 1990 and now abandoned.

FIELD OF THE INVENTION

This invention relates to a process for treating a zeolite to modify its properties.

BACKGROUND OF THE INVENTION

As is well known to those skilled in the art, zeolite catalysts have been used in hydrocarbon processing. Prior art zeolites have been found to be effective as catalysts for cracking, hydrocracking, hydrosulfurization, etc. Recent trends in resid hydroprocessing demand increased conversion of feed having a boiling point above 1000° F. as well as improved hydrogenation selectivity as measured by Conradson carbon conversion and hydrodenitrogenation (HDN) of the 1000° F.- products attained from cracking of the residue.

It is an object of this invention to provide a process for treating a zeolite to yield a novel treated zeolite which is characterized by improved properties. Other objects will be apparent to those skilled in the art.

STATEMENT OF THE INVENTION

The process of treating a charge zeolite selected from the group consisting of ultrastable Y-zeolites having a silica to alumina mole ratio of 6-20, superultrastable Y-zeolites having a silica to alumina mole ratio of at least about 18 and a lattice constant of 24.20 A-24.48 A, said charge being characterized by (i) a secondary pore volume less than about 0.05 cc/g, and (ii) a Surface Silicon to Aluminum atom ratio of 1.0-2.5 and (iii) an Acid Site Density of 7-32 which comprises contacting said charge zeolite with steam at 1000° F.-1200° F.;
  maintaining said charge zeolite in said contact with steam for 0.5-5 hours during which time said charge zeolite is converted into a hydrothermally-treated zeolite characterized by (i) a secondary pore volume of about 0.09-0.13 cc/g, (ii) a silica to alumina mole ratio of about 16-36 cc/g, (iii) a decreased lattice constant of below about 24.39 A; (iv) a Surface Silicon Alumina Atom ratio of 1.0-2.5 and (v) an Acid Site Density of about 5-16; and
  contacting said hydrothermally-treated zeolite in acidic medium at 140° F.-220° F. for 0.5-3 hours thereby converting said hydrothermally treated zeolite into a hydrothermally-treated acidified zeolite characterized by (i) a silica to alumina mole ratio of about 60-80, (ii) an increased Secondary Pore Volume of about 0.11-0.14 cc/g, (iii) a decreased lattice constant of below about 24.19 A; (iv) a Surface Silicon to Aluminum Atom ratio of 26-36 and (v) an Acid Site Density of about 1-6; and
  recovering said hydrothermally-treated acidified zeolite characterized by (i) a Silica to Alumina mole ratio of about 60-80 cc/g, (ii) an increased secondary pore volume of about 0.11-0.14 cc/g, (iii) a decreased lattice constant of below about 24.19 A; (iv) a Surface Silicon to aluminum atom ratio of 26-36 and (v) an Acid Site Density of about 1.5.

DESCRIPTION OF THE INVENTION

The charge zeolites which may be treated by the process of this invention are typically characterized by various properties including pore size, unit cell size, silicon to aluminum atom ratio, etc.

Primary Pore Size—The primary pores are small pores characterized by a pore diameter of less than about 100 A, and typically 20 A-40 A, say 23 A. These small or micropores are commonly present together with supermicropores having a pore diameter of 40 A-100 A, say 47 A. Pore size is measured by nitrogen desorption isotherma.

Primary Pore Volume—The volume of the primary pores is typically 0.08-0.14, say 0.11 cc per gram of zeolite. Primary Pore Volume is measured by nitrogen desorption isotherm.

Unit Cell Size—The unit cell size (or lattice constant) of the charge zeolites which may be improved by the process of this invention is typically 24.20 A-24.60 A. Unit cell size is measured using a Scintag PAD-V X-ray diffractometer.

Secondary Pore Size—The secondary pores are large pores characterized by a pore size (diameter) of greater than 100 A, and typically 100 A-600 A. Secondary pore size is measured by the nitrogen desorption isotherm.

Secondary Pore Volume—The charge zeolites which may be treated by the process of this invention are characterized by a low secondary pore volume. Typical secondary pore volumes are below about 0.05 cc/g and commonly in the range of 0.02-0.05 cc/g. Thus the charge zeolites may be considered as being essentially free of secondary pores. Secondary pore volume is measured by the nitrogen desorption isotherm.

Secondary Pore Mode—The secondary pore mode of the charge zeolites typically is essentially zero.

Total Pore Volume—The total pore volume of the charge zeolites which may be treated by the process of this invention may be 0.10-0.12 cc/g, say about 0.10 cc/g (as measured by nitrogen desorption isotherm.

Total Surface Area—The total surface area of the charge zeolites which may be treated by the process of this invention may be 600-700 m$^2$/g, say 680 m$^2$/g (as measured by Brunauer-Emmett-Teller (BET) Technique.

Crystallinity—The crystallinity of the charge zeolites which may be treated by the process of this invention may be 85%-100%, say 92% (as measured by X-ray diffraction.

Silica-to-Alumina ratio—The silica-to-alumina mole ratio of the charge zeolites which may be treated by the process of this invention may be 6-20, say 6. This is equivalent to a silicon-to-aluminum atom ratio of 3-10, say 3.

Surface Si:Al Ratio—The Surface Si:Al ratio of the charge zeolite which may be treated by the process of this invention (as measured by X-ray photoelectron spectroscopy) may be 1.4-2.5, say 2. This is the ratio which pervails over a depth of 50 A on the surface of the particle.

Zeolite Content—The charge zeolites which may be treated by the process of this invention may be of high zeolite content—typically 85%-100%, say 100%.

Acid Site Density—The acid site density of the charge zeolites which may be treated by the process of this invention may typically be 22-32, say 28 (as measured by temperature programmed desorption of ammonia TPD).

Acid Resistance—The acid resistance of the charge zeolites which may be treated by the process of this invention may typically be 0–30, say 10 (as measured by loss of zeolite crystallinity in contact with a standard acid solution).

The charge zeolites may include, ultrastable Y-zeolites and superultrastable Y-zeolites.

It is a feature of this process that it permits attainment of outstanding results when the charge zeolite is an ultrastable Y-type zeolite.

The charge zeolite may be in the hydrogen form, the ammonium form, or preferably in an exchanged form i.e. a form in which the alkali metal has been exchanged as for one or more rare earth metals. The preferred form is an ammonium Y-zeolite.

Illustrative commercially available zeolites which may be treated by the process of this invention may include the following, the properties of which are set forth in the table which follows:

TABLE

Typical Charge Zeolites
A. The Valfor CP 300-56 brand of ultrastable Y-zeolite of PQ Corp.
B. The Valfor CP 300-35 brand of superultrastable Y-zeolite of PQ Corp.

| Property | CHARGE ZEOLITE A | CHARGE ZEOLITE B |
|---|---|---|
| Primary Pore Size A | 50 | 85 |
| Primary Pore Volume cc/gg | 0.08 | 0.11 |
| Unit Cell Size A | 24.57 | 24.35 |
| Secondary Pore Size A | none | 100–600 |
| Secondary Pore Volume cc/g | 0.02 | 0.12 |
| Total Pore Volume cc/g | 0.114 | 0.23 |
| Total Surface Area m$^2$/g | 683 | 584 |
| Crystallinity % | 100 | 87 |
| SiO$_2$ to Al$_2$O$_3$, Ratio | 6 | 18 |
| Acid Site Density cc/g | 28.9 | 6.5 |

The preferred charge zeolite is an ultrastable zeolite such as the CP300-56 USY brand of ultrastable Y-type zeolite of PQ Corp.

It is a feature of the process of this invention that the charge, preferably an ultrastable Y-type zeolite, is contacted with steam at 1000° F.–1200° F., say 1000° F. Preferably the steam employed should contain little or no other gases such as an carbon dioxide, oxygen, nitrogen, etc. In the preferred embodiment, the steam will be substantially 100% steam i.e. it contains less than about 10 w % of non-steam components. It is found that presence of non-steam components in amount greater than about 10 w % is undesirable because it slows down the reaction.

Although operation at temperature slightly below about 1000° F. (say down to about 800° F.) may be employed, it is found that the desired results are attained to a lesser degree. At temperature of about 600° F. or less, the desired changes may not be attained to any desired degree. Operation at temperature above about 1200° F. undesirably increases the cost of operation; and as the temperature rises above this level, there is increasing chance of deactivating the catalyst. Furthermore it does not appear that it is possible to consistently attain desired low lattice constant at 1200° F. or above.

The charge zeolite is maintained at the noted steaming temperature for 0.5–5 hours, preferably 1–5, say about 5 hours. Operation below the lower end of the range does not yield significant improvement; and operation above the upper end of the range normally yields little or no additional improvement. It is found that the desired degree of improvement (as measured for example by the decrease in the lattice constant) is typically obtained after about 3–5 hours. Typically the improvement becomes asymtotic after about 5 hours.

At the conclusion of the desired contacting with steam for 0.5–5 hours at 1000° F. to below 1200° F. the treated zeolite is recovered and cooled to ambient temperature.

The characerics of the treated zeolite may be as follows:

Primary Pore Size—The primary pore size is typically 20 A–100 A, say about 47 A. Thus it may be observed that there is no significant change in primary pore size.

Primary Pore Volume—The primary pore volume is typically 0.07–0.09, say about 0.08 cc/g. Thus it may be observe that there is no significant change in primary pore volume.

Unit Cell Size—The unit cell size (or lattice constant) of the treated zeolite is unexpectedly decreased to as low as 24.25 A and typically to 24.27 A–24.39 A, say 24.28–24.35.

Secondary Pore Size—The secondary pore size of the treated zeolite is typically 100 A–600 A and commonly 105A–190 A.

Secondary Pore Volume of the treated zeolite is 0.09–0.13, say 0.10 cc/g. It is unexpected that the secondary pore volume should increase by 300%–600%, say 400% over the secondary pore volume of the charge zeolite.

Total Pore Volume—The pore volume of the treated zeolite is 0.16–0.20 cc/g, say 0.18 cc/g which is unexpectedly 50%–90%, say 70% greater than the total pore volume of the charge zeolite.

Total Surface Area—The total surface area of the treated zeolite is 500–600 m$^2$/g, say 573 m$^2$/g.

Crystallinity—The crystallinity of the treated zeolite is 75%–95%, say 85%.

Silica-Alumina Mole Ratio—The silica-to-alumina ratio of the treated zeolite is 14–36, say 16. This corresponds to a silicon-to-aluminum ratio of 7–18, say 8.

Surface Si:Al ratio—The Surface Si:Al, atom ratio is typically 1.0–1.5, say 1.1 which is only 60–70% of that of the charge zeolite. This Al-enriched surface is characterized by having a low total number of acid sites. The Surface Si:Al ratio is measured by X-ray photolectron spectroscopy.

Acid Site Density—The acid site density of the treated zeolite is 1–10, say 10.

Acid Resistance—The acid resistance of the treated zeolite is 60%–100%, say 85%.

It will this be apparent that the treated zeolite is particularly characterized by (i) an increase in the number and volume of secondary pores (about 100 A–600 A), (ii) a decrease in the unit cell size (or lattice constant), (iii) a decrease in the crystallinity and (iv) a decrease in the surface silicon-to-aluminum ratio. These treated zeolites are also characterized by (i) a primary pore size and volume which is essentially comparable to that of the charge zeolite, (ii) a decrease in total surface area (iii) decreased acid site density and (iv) increased acid resistance.

It is a feature of the process of this invention that the hydrothermally treated Y-zeolite may be contacted in aqueous medium with an acid having a PK$_a$ of less than about 5 and typically in the range of about 1–2.5.

The acids which may be employed may include water-soluble inorganic acids typified by the following; (the $PK_a$ set forth for polybasic acids is that corresponding to the first ionization constant):

TABLE

| Acid | $PK_a$ |
|---|---|
| Nitric | Completely Dissociated |
| Hydrochloric | 1.0 |
| Sulfuric | Completely Dissociated |
| o-phosphoric | 2.12 |

Acid gases such as hydrogen chloride, etc. may be employed.

Typical water-soluble organic acids which may be employed may be typified by the following:

TABLE

| Acid | $PK_a$ |
|---|---|
| Citric | 3.08 |
| Acetic | 4.75 |
| Oxalic | 1.23 |
| Propionic | 4.87 |

The preferred inorganic acids include strong mineral acids such as nitric acid or hydrochloric acid. The preferred organic acids include citric acid or acetic acid. The most preferred acid is nitric acid.

The acids may be employed in aqueous media in concentrations of 0.1N–2.0N, say 0.5N. Treating of the hydrothermally treated zeolites may typically be effected by contacting 100 parts of hydrothermally treated zeolite with 1000–5000 parts, say 2500 parts of 0.1N–2.0N aqueous acid at 140° F.–220° F., say 140° F. for 0.5–3 hours, say 2 hours.

At the end of the acidification operation operation, the zeolite particles may be separated from the aqueous acid medium and water-washed several times with water at ambient temperature. During each washing, the zeolite may contact the wash water for 1.2–2 hours, say 0.5 hours. Each washing may utilize 1000–5000 parts, say 2500 parts per 100 parts of zeolite.

The acidified, hydrothermally treated zeolite may be characterized as follows:

Primary Pore Size—The primary pore size is typically 20 A–100 A, say about 47 A.

Primary Pore Volume—The primary pore volume is typically 0.09–0.12, say about 0.10 cc/g.

Unit Cell Size—The unit cell size (or lattice constant) of the treated Y-zeolite is unexpectedly decreased to below about 24.19 A and typically to 24.05 A–24.18 A, say 24.15–24.17. There is no zeolite disclosed in the prior art having a lattice constant as low as this. The lowest value previously reported appears to be 24.20. (as reported at Developments In Zeolite Catalysis, Catalytica Studies No. 4187Z 1987 page 13). A Unit cell size of 24.19 is the lower theoretical limit for Y-type zeolites as determined by the Breck and Flanigen equation.

Secondary Pore Size—The secondary pore size of the treated zeolite is typically 100 A–600 A and commonly 105 A–190 A.

Secondary Pore Volume of the treated zeolite is 0.11–0.14, say 0.13 cc/g. It is unexpected that the secondary pore volume should increase by 300%–500%, say 400% over the secondary pore volume of the charge zeolite.

Total Pore Volume—The pore volume of the treated zeolite is 0.16–0.25 cc/g, say 0.23 cc/g which is unexpectedly 50%–150%, say 100% greater than the total pore volume of the charge zeolite.

Total Surface Area—The total surface area of the treated zeolite is 350–800 m²/g, say 721 m²/g.

Crystallinity—The crystallinity of the treated zeolite is 45%–65%, say 50%.

Silicon-Aluminum Ratio—The silicon-to-aluminum ratio of the treated zeolite is 30–40, say about 38.5. This corresponds to a silica-to-alumina ratio of 60–80, say 77.

Surface Al:Si Ratio—The surface Al:Si atom ratio is typically 24–40, say 30.

Zeolite Content—The zeolite content of the treated zeolite is 60–85%, say 45% of the charge zeolite.

Acid Site Density—The acid site density of the treated zeolite is 1–6, say 3.

Acid Resistance—The acid resistance of the treated zeolite is 80%–100%, say 95%.

It is to be noted that the hydrothermally, acid-treated zeolite is particularly characterized by:

(i) an unexpectedly large increase in the number of secondary pores as is evidenced by the increase in pore volume. It will be noted that the charge zeolite is characterized by a secondary pore volume of only 0.02–0.05 cc/g and the hydrothermally treated zeolite is characterized by a secondary pore volume of 0.09–0.13 cc/g—while the hydrothermally and acidified zeolite is characterized by a secondary pore volume of 0.11–0.14 cc/g.

(ii) a substantially decreased lattice constant. The charge typically has a lattice constant of 24.20–24.60, say 24.57 and the hydrothermally treated zeolite has a lattice constant of typically 24.27–24.39. The hydrothermally treated acidified zeolite has a lattice constant of 24.05–24.18, say 24.15 which is below the lowest value of 24.20 as reported in the catalytica reference supra.

(iii) a substantial decrease in the Acid Site Density. The charge typically has an Acid Site Density of 22–32 and the hydrothermally treated zeolite has an Acid Site Density of 5–16 and the hydrothermally treated acidfied zeolite has an Acid Site Density of 1–6.

It is a feature of the treated zeolites of the invention (typically present in particles of particle size of 0.02–0.4) that they may be mixed with suitable binders, such as silica or alumina to form a mix containing 10–90 w % zeolite. This mix may be extruded, dried at 250° F.–400° F., say 350° F., calcined at 1000° F.–1400° F., say 1200° F. for 0.5–5 hours, say 2 hours, and impregnated with metals which are useful as H-Oil catalysts—typically Ni-Mo, Co, Ni-Mo-P, Co-Mo-P, etc. A typical such catalyst may contain 2.7 w % Ni and 10 w % Mo on a 1 mm particle containing 80 w % alumina and 20 w % treated zeolite.

This catalyst may be used in a hydrotreating process. Typically in a hydrotreating process (typified by the H-Oil brand of process), reaction is carried out in an ebullated bed reactor containing particulate catalyst. Temperature of operation may be 650° F.–950° F., preferably 750° F.–850° F., say 805° F. at 1000–4000 psig, preferably 2000–3000 psig, say 2500 psig. Space velocity is sufficient to maintain the bed of particulate catalyst in an expanded state. Hydrogen is admitted, with the charge hydrocarbon, in amount of 1000–50,000 SCFB, preferably 5000–10,000 SCFB.

Typical H-Oil feed is an atmospheric reduced crude or a vacuum bottoms; and commonly 95% of the feed boils above 975° F. It typically may contain 1–10 w % sulfur and up to 1000 ppm metals (including nickel and vanadium).

H-Oil product is characterized by lower density and boiling point, lower sulfur content, and lower content of metals.

This zeolite catalyst support may also be loaded with e.g. platinum-group noble metals and utilized in hydrogenation processes or wax conversion (to distillate fuels).

It is also a feature of the zeolite product of this invention that it may be useful as a catalyst in hydrocarbon cracking as in a fluid catalytic cracking process wherein hydrocarbon charge, such as a gas oil, is cracked at 900° F.–1100° F., typically 960° F. at 0–20 psig, say 0 psig. It is found that the novel catalyst of this invention may be particularly effective in cracking the 900+F. ibp fraction of charge gas oils. As determined by the slurry oil in the cracked product (i.e. % of the oil boiling at least as high as 670° F.) the zeolite catalyst of this invention desirably yields crackate having typically 10% less of the slurry oil than prior art zeolites. This is believed to be due to the presence of an increased volume of Secondary Pores (which is typically 0.05–0.15 cc/g, as distinguished from prior art zeolites which are essentially free of Secondary Pores) and an increased Secondary Pore Mode (which is typically 105 A–190 A as distinguished from prior art zeolites which do not have a Secondary Pore Mode—because of the absence of Secondary Pores).

DESCRIPTION OF SPECIFIC EMBODIMENTS

Practice of the process of this invention will be apparent to those skilled in the art from inspection of the following wherein all parts are parts by weight unless otherwise stated. An asterisk indicates a control example.

EXAMPLE I

In this example, which represents the best mode presently known of carrying out the process of this invention, the charge zeolite is the Valfor CP-300-56 USY brand of ammonium ultrastable Y-type zeolite of PQ Corp. This Y-zeolite is a characterized by the properties set forth in the table infra.

In this example, the charge zeolite (as crystals of particle size of 0.2–0.4 microns) is contacted with essentially 100% steam for 5 hours at 1000° F. This charge zeolite is characterized as in the following table. At the end of the treating period, the hydrothermally treated zeolite is characterized as in the following table. The hydrothermally treated zeolite is cooled to 140° F. and contacted with 0.5N aqueous nitric acid (4 parts of zeolite per 100 parts of nitric acid) at 140° F. for 2 hours. The aqueous liquid is then removed and the zeolite dried for 24 hours at 250° F.

TABLE

| Property | Charge Zeolite | Steam Treated Zeolite | Acidified Zeolite |
|---|---|---|---|
| Primary Pore Size A | 23 | 47 | 47 |
| Primary Pore Volume | 0.09 | 0.08 | 0.10 |
| Unit Cell Size A | 24.57 | 24.39 | 24.12 |
| Secondary Pore Volume cc/g | 0.02 | 0.10 | 0.13 |
| Secondary Pore Mode A | — | 115 | 125 |
| Total Pore Volume cc/g | 0.11 | 0.18 | 0.23 |
| Total Surface Area m2/g | 683 | 573 | 721 |
| Crystallinity % | 100 | 88 | 50 |
| SiO2:Al2O3 Mole Ratio | 6 | 16 | 77 |
| Surface Si:Al Ratio | 2.5 | 1.3 | 30 |
| Zeolite Content | 100 | 82 | 45 |
| Acid Site Density cc/g | 28.9 | 10 | 3 |
| Acid Resistance | 0 | 88 | 95 |

Preparation of catalyst from this treated zeolite may be carried out by mixing 20 parts of zeolite and 80 parts of gamma alumina, extruding to form 1 mm×6 mm cylinders, drying at 350° F. for 4 hours, calcining at 1200° F. for one hour, and then loading. The particles are immersed in nickel nitrate solution for 24 hours, dried at 250° F. for 4 hours, and calcined at 1200° F. for one hour. The particles are then immersed in aqueous ammonium molybdate solution for 24 hours, dried at 350° F. for 4 hours, and calcined at 1200° F. for one hour.

This catalyst may be employed in an H-Oil process to which is charged an Arabian Medium/Heavy Vacuum Resid having the following properties:

TABLE I

| Typical Petroleum Feedstock (Arabian Medium/Heavy Vacuum Resid) | |
|---|---|
| API Gravity | 4.8 |
| 1000° F.+, vol % | 87.5 |
| 1000° F.+, wt % | 88.5 |
| Sulfur, wt % | 5.0 |
| Total Nitrogen, wppm | 4480 |
| Hydrogen, wt % | 10.27 |
| Carbon, wt % | 84.26 |
| Alcor MCR, wt % | 22.2 |
| Kinematic Viscosity, cSt | |
| @ 212 F. | 2430 |
| @ 250 F. | 410 |
| @ 300 F. | 117 |
| Pour Point, °F. | 110 |
| n-C5 Insolubles, wt % | 28.4 |
| n-C7 Insolubles, wt % | 9.96 |
| Toluene Insolubles, wt % | 0.02 |
| Asphaltenes, w % | 9.94 |
| Metals, wppm | |
| Ni | 49 |
| V | 134 |
| Fe | 10 |
| Cu | 3 |
| Na | 49 |
| Chloride, wppm | 28 |

Charge may be admitted in liquid phase at 770° F. and 2250 psig to an ebullated bed of catalyst. Space velocity LHSV is 0.56. Hydrogen is admitted in amount of 7000 SCFB.

Hydrocarbon product may be characterized by increased content of liquid boiling below 1000° F.

EXAMPLES II-VI

In this series of Examples, the same charge as that to Example I was subjected to steam treating and acid treating conditions. Various properties were determined as a function of the treating conditions.

Steam Treatment:—Treating agent was 100% steam at 1000° F. except that the steam temperature was 1400° F. in Example VI. Treating time was 2 hours in Example II, 0.5 hours in Example V, and 5 hours in the remaining Examples.

Acid Treatment Conditions:—All runs were carried out for 2 hours at 140° F. except II which used 220° F. Examples II, VI and VI used 0.5N aqueous nitric acid.

Examples III, V, VII, and VIII used 2.0N aqueous nitric acid. All examples used a weight ratio of 0.04—ratio of solid to liquid during contacting.

TABLE

| Example | Zeolite Content % | Unite Cell Size A | Total Pore Vol CC/g | Surface Si:Al Atom Ratio | Pore Vol 100-600 A | Pore Mode A | Total Surface Area m$^2$/g | Acid Site Density ccNH$_3$/gCO |
|---------|-------------------|-------------------|---------------------|--------------------------|--------------------|-------------|----------------------------|-------------------------------|
| II      | 45                | 24.15             | 0.24                | —                        | 0.13               | 135         | 717                        | —                             |
| III     | 50                | 24.12             | 0.23                | 30                       | 0.12               | 125         | 721                        | —                             |
| IV      | 59                | 24.18             | 0.23                | —                        | 0.12               | 125         | 782                        | 5.1                           |
| V       | 64                | 24.17             | 0.24                | 30                       | 0.14               | 135         | 720                        | 2.4                           |
| VI*     | 63                | 24.18 (24.25) (24.27) | 0.24            | 26                       | 0.14               | 125         | 739                        | 2.7                           |
| VII     | 54                | 24.12             | 0.20                | —                        | 0.11               | 155         | 705                        | 2.1                           |
| VIII    | 43                | 24.05             | 0.22                | 38                       | 0.12               | 145         | 688                        | 2.0                           |

Control Example VI* was run in triplicate. The first time, the lattice constant attained was 24.18 A; the second time 24.25 A; the third time 24.27 A, the latter two being noted in parenthesis. This illustrates that although it may be possible to attain low lattice constant at 1400° F. the results are inconsistent. Consistent reproducible results are only attained by operating below 1200° F.

The inconsistency may be due to rate of heating of the catalyst, the failure to attain steady state due to the short steaming time, etc.

From the above table, it is apparent that:
(i) The Unit Cell Size of the product zeolite may be as low as 24.05 A and may range from 24.05 to 24.18 A. (Down from a charge zeolite at 24.56 A)
(ii) Zeolite content of the product may range from 43 to 64%, the charge zeolite possessing a zeolite content of substantially 100%.
(iii) The Total Pore Volume of the product is about 0.22–0.24 cc/g compared to a charge pore volume of 0.11 cc/g.
(iv) The Pore Volume of the Secondary 100 A–600 A pores is about 0.11–0.14 cc/g compared to a charge Pore Volume of 0.03 cc/g.
(v) The Pore Mode of the treated product may be 125 A–155 A as compared to a charge Pore Mode of 22 A.
(vi) The Total Surface Area of the treated product maybe 688–782 square meters per gram as compared to a charge area of 683 m$^2$/g.

Although this invention has been illustrated by reference to specific embodiments, it will be apparent to those skilled in the art that various charges and modifications may be made which clearly fall within the scope of the invention.

We claim:

1. A hydrocarbon conversion process for converting a heavy hydrocarbon vacuum bottoms charge oil into lighter products which comprises passing said heavy hydrocarbon vacuum bottoms charge oil at hydrocarbon conversion conditions into contact with a hydrocarbon conversion catalyst containing a zeolite selected from the group consisting of ultrastable Y-zeolites and superultrastable Y-zeolites characterized by
   (i) a decreased unit cell size of from about 24.05 Å to less than 24.15 Å,
   (ii) a Secondary Pore Size of 105 Å–190 Å,
   (iii) a Secondary Pore Volume of 0.11–0.14 cc/g,
   (iv) a Secondary Pore Mode of 125 Å–155,
   (v) a Surface Silicon to Aluminum Atom Ratio of 24–30, and
   (vi) an Acid Site Density of about 1–6.

* * * * *